Jan. 27, 1959  E. STUMP ET AL  2,870,650
STEERING GEAR
Filed Nov. 10, 1954
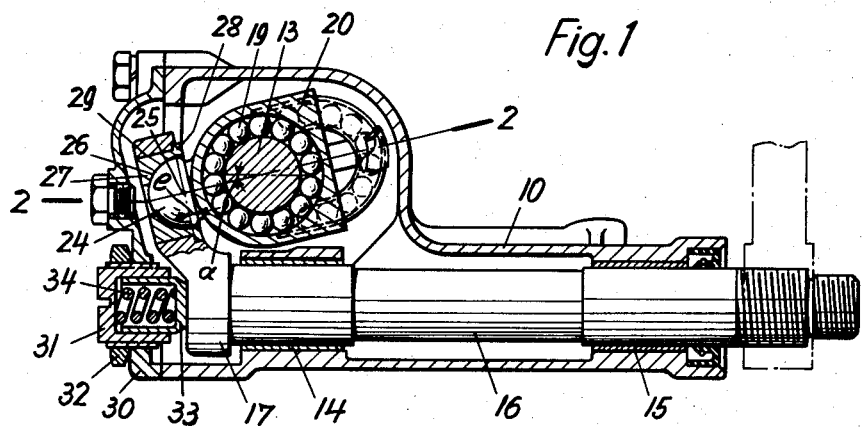
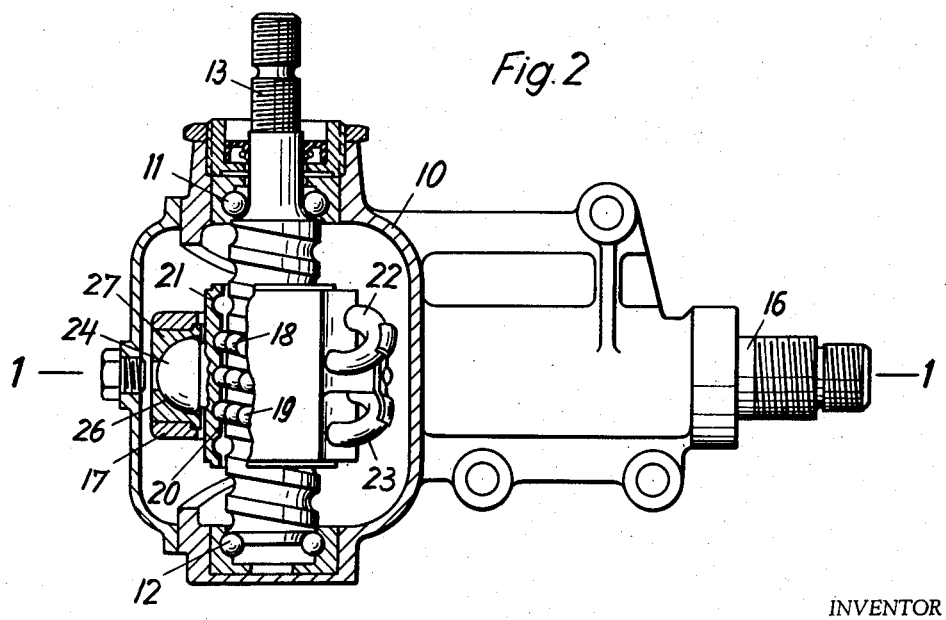
INVENTOR
EUGEN STUMP
HANS SIEGEL
BY Dicke & Craig
ATTORNEY

United States Patent Office 2,870,650
Patented Jan. 27, 1959

2,870,650

STEERING GEAR

Eugen Stump and Hans Siegel, Stuttgart-Unterturkheim, Germany, assignors to Daimler-Benz Aktiengesellschaft, Stuttgart-Unterturkheim, Germany Application November 10, 1954, Serial No. 468,106

Claims priority, application Germany November 11, 1953

8 Claims. (Cl. 74—499)

This invention relates to a steering mechanism for motor vehicles and more particularly to a steering gear having a recirculating ball worm-and-nut mechanism comprising a steering column and a ball nut which are in engagement with each other by one or more endless chains of balls running in matching associated worm-groove raceways, so that the turning motion of the steering column is transformed into an essentially axial movement of the ball nut, the movement of which is transmitted by means of a ball pivot to a steering lever, whose shaft crosses the ball nut.

The employment of one or more ball trains, which ensure frictionless engagement between steering column and ball nut, requires generally a relatively large outside diameter. This results in the disadvantage that the point of support between ball pivot and steering lever also requires a location at a corresponding distance from the axis of the steering column. Such arrangements are therefore unsatisfactory in at least two respects. They are attended by objectionable eccentric forces as well as by a relatively large increase in bulkiness of the steering mechanism.

It is therefore a primary object of the present invention to provide a steering mechanism which, despite the employment of one or more ball trains, is very small and compact in structure and which is so constructed that the eccentricity of the application of force between ball pivot and steering lever in relation to the axis of the steering column is reduced to a minimum.

Another object of the present invention is to provide a steering mechanism whose components are so constructed as to ensure reliable and absolutely positive engagement of the elements for transmitting the motion between ball nut and steering lever.

A further object of the present invention is to provide a steering mechanism whose elements effecting the transmission of force distinguish themselves by their rugged strength.

An important feature of the present invention resides accordingly in having the ball pivot formed as a part-spherical, at the most hemispherical or semi-circular pivot and made integral with the ball nut, the spherical area of contact thereof being toward the side of the ball nut at least bounded by the plane extending through the center of the sphere and lying perpendicularly to the axis of the part-spherical pivot, so that the part-spherical pivot joins the ball nut directly with its wide base. With this arrangement the point of application in the transmission of force from the ball pivot to the steering lever may be located directly or almost directly at the periphery of the ball nut body and therewith at the shortest possible distance from the worm-groove raceways in the ball nut receiving the ball train or ball trains. This results at the same time in rugged strength of the ball pivot made integrally with the ball nut, because it eliminates bores or other means for the reception of the pivot in the ball-nut body, and makes possible the joining of the ball pivot to the ball-nut body on a wide base.

By reason of the hemispherical or semi-circular shape and form of the ball pivot, its entire spherical area can be kept in working contact with a matching ball socket in the steering lever by engagement from one side, especially by spring pressure, so that minimum contact pressure is ensured, its close and compact structure notwithstanding.

At the same time the distance between steering lever and axis of the steering column may be kept at a minimum, so that the distance from the center of the ball pivot to the outer diameter of the internal worm-groove raceways in the ball nut may be of lesser dimension than the radius of the ball pivot.

A further object of the present invention concerns the reliable and positive absorption of axial forces between ball pivot and ball socket.

A still further object of the present invention concerns an additional safeguard for ensuring also absolutely reliable engagement of ball pivot and ball socket along the largest periphery in case of employment of an axially resiliently supported steering lever even if the ball pivot should be raised from the ball socket by occurring road shocks or other driving forces.

An embodiment of the invention, as applied to the steering mechanism of a motor vehicle, is illustrated by way of example in the accompanying drawings, in which:

Fig. 1 is a sectional view of the steering gear taken in the plane of line 1—1 of Fig. 2, and Fig. 2 is a part sectional top plan view of the steering gear taken in the plane of line 2—2 of Fig. 1.

Referring to the drawings it will be noted that the steering gear includes a steering-gear housing 10 in which are supported, on the one hand, a steering-wheel spindle or column 13 by means of thrust ball bearings 11 and 12, and on the other hand, a steering-gear shaft 16 with its lever 17 by means of sleeve bearings 14 and 15.

The steering column 13 with its ball-worm end provided with an external helical groove is in engagement with a ball nut 20 by means of two endless trains of balls 18 and 19 which run in worm-groove raceways 21. The balls of each endless ball train are recirculated in a conventional manner from one end of the ball worm to its other end by means of recirculating tubes 22 and 23.

The ball nut 20 is provided with a hemispherical or semi-circular ball pivot 24 made integrally therewith in such a manner that the center 25 of the ball 24 is located directly adjacent to the periphery of the ball-nut body proper. The semi-spherical ball pivot 24 engages a matching ball socket 26 formed by an insert 27 which is provided with a shoulder 28 and inserted into a bore 29 in the steering lever 17 from the side of the ball nut 20 and which is extended cylindrically toward the ball nut 20 by a distance $e$ beyond a transverse plane passing through the center 25 of the ball pivot 24.

An adjusting screw in the form of a socket 31 is adjustably screwed into the cover 30 of the steering-gear housing 10 and locked by a lock nut 32. Slidably mounted in the socket 31 is another socket 33 which in the axial direction thereof is urged against the steering-gear shaft 16 by a spring 34 in such a manner that a continuous abutting engagement between ball pivot 24 and ball socket 26 is ensured.

Moreover, the lever 17 is dimensioned so short in length that the axis of the ball pivot 24 and a plane passing through the axis of the steering column and in parallel with the axis of the steering-gear shaft 16 enclose an angle $\alpha$ when the steering gear is in its mid-position.

It is thus readily apparent that the present invention provides an improved steering gear which distinguishes itself by its exceptional compact structure and other advantageous features, namely, the force transmitted by the ball nut 20 to the steering lever 17, which for all practical purposes acts through the center 25 of the ball pivot 24, is effective at the shortest possible distance from the axis of the steering column 13. Furthermore, the inclination of the ball pivot 24 in conformity with the angle α makes for a still compacter structure. And if road shocks or other driving shocks occur in a direction opposite to the action of the spring 34, there will still be maintained an annular area of contact between the ball pivot 24 and the ball socket 26 on account of the cylindrical extension e thereof.

It is to be understood that changes may be made in the construction and in the combination and arrangement of the several parts, provided that such changes fall within the scope of the appended claims.

What we claim is:

1. A steering gear comprising a steering column provided with external ball-worm grooves, a ball nut surrounding said steering column with clearance and provided with internal ball-worm grooves, a ball train running in the grooved raceways formed by the two matching ball-worm grooves and effecting the engagement of said steering column with said ball nut for transmitting the steering motion, a steering-gear shaft for passing on the steering motion arranged transversely to said steering column, a steering lever arranged on the inner end of said steering-gear shaft and extending therefrom toward one side of said ball nut, a hemispherical cavity in the form of a ball socket in said steering lever, an essentially hemispherical member having a wide base and constituting a ball pivot essentially matching said cavity and being in direct force-transmitting engagement therewith over the matching surfaces of said cavity and said member and arranged with its wide base directly on said ball nut and being made integrally therewith.

2. A steering gear according to claim 1, wherein said ball pivot is so arranged at the ball nut that the distance from the center of the ball portion of said ball pivot to the outer diameter of said internal ball-worm grooves in said ball nut is smaller than the radius of the ball portion of said ball pivot.

3. A steering gear according to claim 1, further comprising a bore in said steering lever, and an insert containing said spherical cavity arranged in said bore.

4. A steering gear according to claim 1, wherein said steering lever is so shaped and of such length that a plane passing through the axis of said hemispherical member and through the axis of the steering column subtends an acute angle with a plane passing through said steering column and parallel to said steering gear shaft when said steering gear is in the mid position thereof.

5. A steering gear comprising a steering column provided with external ball-worm grooves, a ball nut surrounding said steering column with clearance and provided with internal ball-worm grooves, a ball train running in the grooved raceways formed by the two matching ball-worm grooves and effecting the engagement of said steering column with said ball nut for transmitting the steering motion, a steering-gear shaft for passing on the steering motion arranged transversely to said steering column, a steering lever arranged on the inner end of said steering-gear shaft and extending therefrom toward one side of said ball nut, a hemispherical cavity in the form of a ball socket in said steering lever, an essentially hemispherical member having a wide base and constituting a ball pivot essentially matching said cavity and being in direct force-transmitting engagement therewith over the matching surfaces of said cavity and said member and arranged with its wide base directly on said ball nut and being made integrally therewith, a bore in said steering lever, and an insert containing said spherical cavity arranged in said bore, said insert being provided with a shoulder located toward said ball nut and adapted for supporting it on said steering lever from the side located oppositely to said ball nut.

6. A steering gear according to claim 5 in combination with spring means urging said steering lever with its spherical cavity constituting a ball socket into working engagement with said ball pivot incorporated in said ball nut.

7. A steering gear according to claim 5, wherein said spherical cavity is cylindrically extended by a certain distance beyond a transverse plane placed perpendicularly to the axial direction of said ball pivot and extending through the center of said cavity.

8. A steering gear comprising a steering column provided with external helical ball grooves, a ball nut surrounding said steering column with clearance and provided with internal helical ball grooves, a chain of balls moving in the grooved raceways formed by the two matching helical ball grooves and effecting engagement of said steering column with said ball nut for transmitting the steering motion from the former to the latter, a steering-gear shaft for passing on the steering motion extending transversely to said steering column, a steering lever at the inner end of said steering-gear shaft and extending therefrom toward one side of said ball nut, a hemispherical cavity in the form of a ball socket provided directly in said steering lever, an essentially hemispherical member with a wide base and constituting a ball pivot of a shape essentially complementary to said cavity and being in direct force-transmitting engagement therewith over substantially the entire hemispherical surface thereof, said member being arranged with the wide base thereof directly on said ball nut and being made integrally therewith, and said lever and said ball nut being thereby spaced from each other only a relatively slight distance.

References Cited in the file of this patent

UNITED STATES PATENTS

| 1,893,764 | Douglas | Jan. 10, 1933 |
| 2,019,927 | Porsche | Nov. 5, 1935 |
| 2,489,534 | Mill | Nov. 29, 1949 |
| 2,654,265 | Nallinger | Oct. 6, 1953 |
| 2,688,260 | Muller | Sept. 7, 1954 |

FOREIGN PATENTS

| 642,847 | Germany | Mar. 17, 1937 |
| 822,479 | Germany | Nov. 26, 1951 |
| 698,778 | Great Britain | Oct. 21, 1953 |
| 707,324 | Great Britain | Apr. 14, 1954 |
| 918,301 | Germany | Sept. 23, 1954 |